Nov. 24, 1964   N. A. EVANS   3,158,834
AIRCRAFT LANDING AID
Filed Nov. 13, 1962   2 Sheets-Sheet 1
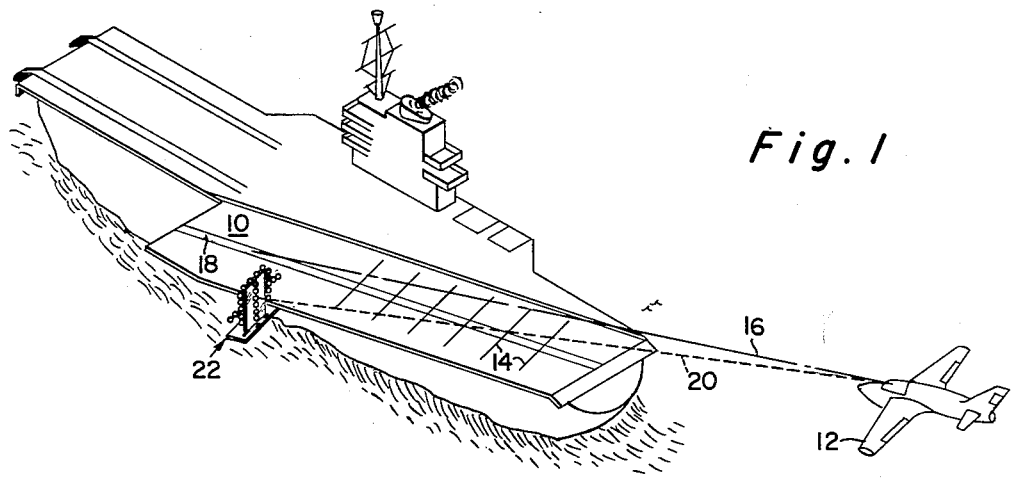
Fig. 1
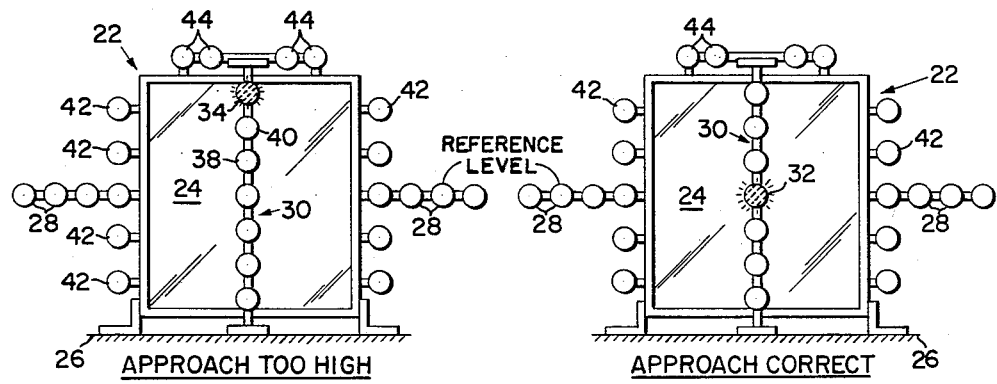
Fig. 2b APPROACH TOO HIGH
Fig. 2a APPROACH CORRECT
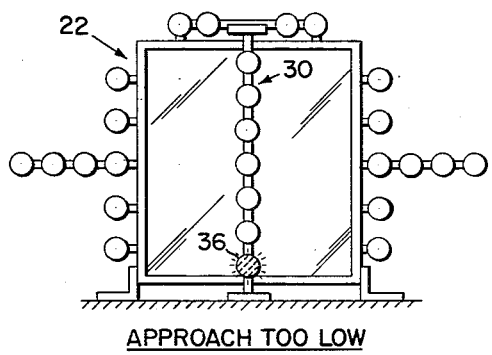
Fig. 2c APPROACH TOO LOW
INVENTOR.
NICHOLAS A. EVANS Nov. 24, 1964 N. A. EVANS 3,158,834
AIRCRAFT LANDING AID
Filed Nov. 13, 1962 2 Sheets-Sheet 2

INVENTOR.
NICHOLAS A. EVANS

United States Patent Office 3,158,834
Patented Nov. 24, 1964

3,158,834
AIRCRAFT LANDING AID
Nicholas A. Evans, 440 Mount Vernon Road,
Newark, Ohio
Filed Nov. 13, 1962, Ser. No. 237,409
3 Claims. (Cl. 340—26)
(Granted under Title 35, U.S. Code (1952), sec. 266)

The invention described herein may be manufactured and used by or for the Government of the United States of America for governmental purposes without the payment of any royalties thereon or therefor.

This invention relates to an optical indicating device, and more particularly to a display apparatus for visually presenting to the pilot of an aircraft information respecting the proper approach angle for the safe landing of such craft on an area of limited size.

Very little difficulty is normally experienced by aircraft pilots in landing their craft on the usual type of commercial or military airfield, since the length of the runways is normally ample to accommodate the requirements of any particular aircraft to which landing clearance has been given. However, the same is not necessarily true of mobile landing platforms or decks such as are found on modern aircraft carriers, such decks seldom exceeding 900 feet in length. In spite of the arresting gear which is designed to intercept and rapidly decelerate an aircraft following touch-down on these decks, it is extremely important that the entire landing operation follow precise standards, as otherwise damage to the aircraft and/or injury to the pilot is likely to occur.

One of the earliest methods designed to guide the pilot toward a safe landing on an aircraft carrier (and which method is still extensively employed) utilizes the services of an individual who is trained to convey visual information to the pilot of the aircraft with respect to the craft's position. This individual, usually designated the Landing Signal Officer (LSO) stands to one side of the runway and signals the pilot by means of small paddles held in each hand. Obviously the effectiveness of such a method depends upon many factors, such as the skill of the LSO, the experience of the pilot, and both the weather and sea conditions existing at the time of the landing operation. This particular method of guiding a pilot to a safe landing is still used under favorable conditions, but the increasing landing speeds of jet aircraft reduces the available time during which signals may be given to a period so short that it is frequently impossible to convey all of the information required by the pilot.

In recognition of this deficiency in the above-described procedure, an optical system has been heretofore devised which more or less automatically conveys information to the pilot and eliminates the necessity for the LSO to "wave-in" the aircraft. This optical system incorporates a mirror positioned to one side of the runway and oriented at an angle thereto so as to present to the pilot of an approaching aircraft the image of a fixed light source arranged in front of the mirror in such a position that light therefrom is reflected to the pilot. The path defined by the reflected light is chosen to generally coincide with the optimum aircraft approach angle when the image of the light source appears at a predetermined location on the mirror. A horizontal reference line is established at the mirror, and the pilot observes the image of the light source at a certain vertical position with respect to this reference line, the image appearing to move up or down in accordance with variations in the aircraft's angle of approach. If the angle of approach is too great (or, in other words, if the aircraft is too high) then the observed image will appear to lie above the reference line. Similarly, if the angle of approach is too small (meaning that the aircraft is too low) then the image will be below the reference line. Only with a correct approach angle will the image and the reference line substantially coincide in a horizontal sense.

Such a system finds wide use at the present time, but is subject to a number of disadvantages, the principal one of which is that the deck or runway of an aircraft carrier is subject to considerable movement as a result of rolling and pitching of the vessel. This causes the reflected light to correspondingly change its angle with respect to the horizon. This problem has been recognized, and attempts have been made to correct the condition by mounting the apparatus on a gyro-stabilized platform, but the disadvantages are not entirely eliminated because the amount of pitching and rolling of the deck is not conveyed to the pilot and he is therefore unable to take this factor into consideration in landing. Another drawback is that solar reflection occurs from the mirror when the sun is low on the horizon, and in extreme cases the entire mirror system is rendered practically invisible. When gyros are used for stabilizing purposes, it is difficult to place complete reliance upon the mechanism, since such systems are highly prone to electrical and/or mechanical malfunction. Furthermore, their initial expense is quite high and maintenance cost almost prohibitive. A still further disadvantage arising from the use of a system of the type being described is that in the event of a breakdown or other damage to the apparatus, the only landing aid available for the pilot is a "talking-down" by the LSO with conventional paddles.

In any consideration of the advantages presented by the apparatus herein disclosed, it should be borne in mind that a number of physiological factors are also present in any operation involving the landing of an aircraft. Especially under the circumstances described, the pilot quickly becomes accustomed to the presence of the conventional reflecting device, and when the latter (commonly known as the "meat-ball") is for any reason inoperative, it is disconcerting to him to be forced to adapt to guidance in the form of manually-held paddles. Radio control is likewise not completely satisfactory, since instructions conveyed verbally are not interpreted as rapidly as visual instructions, and the precise amount of correction required is difficult to convey in this manner. It is extremely important that the pilot be given his position by a presentation identical to that which he has been trained to interpret. All of these objectives could be met through the use of a reliable visual display system that is capable of setting forth in definite fashion the direction and amount of any positional correction of the aircraft, that is necessary to achieve a satisfactory landing operation. Along this line, it may be mentioned that at night, or during periods of restricted visibility, it is a common occurrence for the pilot to lose the "meat-ball" early in his approach, with no indication being provided as to the *direction* in which it has departed. The pilot is consequently at a complete loss as to whether he is too high or too low, and, as a result, is quite likely to make an improper landing with possible serious consequences. If he is too high, by the time he discovers it (usually by the LSO telling him by radio) he is too close in to dive for the glide path, and, similarly, if he is too low, he flys level until he intercepts the path, but this interception usually occurs so close in that insufficient time remains to complete the landing without radical or unsafe maneuvering close in to the carrier.

According to a feature of the present invention, an auxiliary visual landing system is provided which may either supplement the standard mirror landing system in the event of a malfunction by the latter, or, if desired, completely replace the equipment now being used. An important characteristic of the system herein set forth is that the Landing Signal Officer is given full control over all aircraft landings, and is able to utilize his knowledge and experience in determining what information is to be presented to the pilot of an approaching craft. Basically, an artificial "meat-ball" is substituted for the present system, entirely eliminating the need for reflected energy. A characteristic of the disclosure is that the information to be conveyed to the pilot is *determined* by the LSO, and hence the pilot can rely upon such information as constituting a calculated evaluation of his approach pattern. If the deck of the aircraft carrier is pitching or rolling, the LSO simply supplies information through the apparatus under his control of a type that the LSO believes is proper under the circumstances. For landing at night and during times of limited visibility, the LSO observes the approaching aircraft, and leads the pilot to the glide path. In the still further event of damage to, or inoperativeness of, the mirror landing system, the LSO takes over entirely and guides the pilot to the landing strip.

An additional feature of the present disclosure is that it enables the pilot of an approaching aircraft to have knowledge not only of his position relative to the glide path, but also as to the *rate* at which any error is being corrected should he be above or below such path. In other words, not only is the presence of an error indicated, but also the *magnitude* of this error and the *rate* at which the error is being overcome.

One object of the present invention, therefore, is to provide means for facilitating the safe landing of high-speed aircraft on an area of restricted size.

Another object of the invention is to provide a device for visually presenting to the pilot of an aircraft his location relative to a desired line in space, and the amount and direction of any corrective action which should be initiated to bring the aircraft to such line.

A further object of the invention is to provide a system for facilitating the landing of high-speed aircraft upon a carrier, this means being manually controllable in response to an observation of the approaching aircraft by an individual stationed on the carrier and who is capable of predetermining the environmental conditions which will exist at the time the craft actually reaches the landing strip.

Other objects and many of the attendant advantages of this invention will be readily appreciated as the same becomes better understood by reference to the following detailed description when considered in connection with the accompanying drawings, wherein:

FIG. 1 is a perspective view of an aircraft carrier on which has been mounted an aircraft landing aid designed in accordance with a preferred embodiment of the present invention;

FIGS. 2a, 2b and 2c depict various locations of an illuminated indicator light with respect to a fixed horizontal reference level, FIG. 2a illustrating an illuminated datum light as seen by the pilot of an approaching aircraft when he is on the correct glide path, FIG. 2b when he is approaching too high, i.e., at too steep an angle, and FIG. 2c when he is approaching too low;

Figure 3:
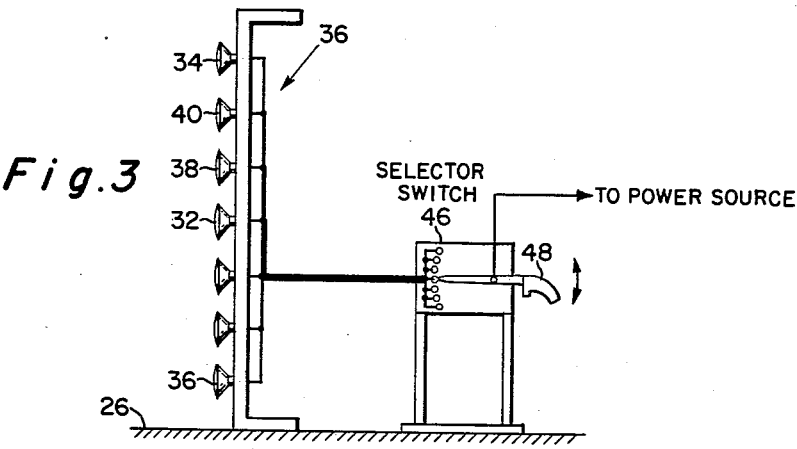
Figure 4:
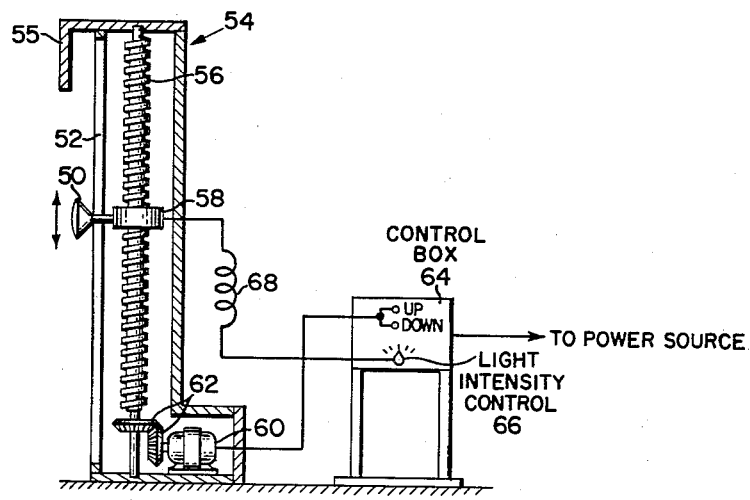
Figure 5:
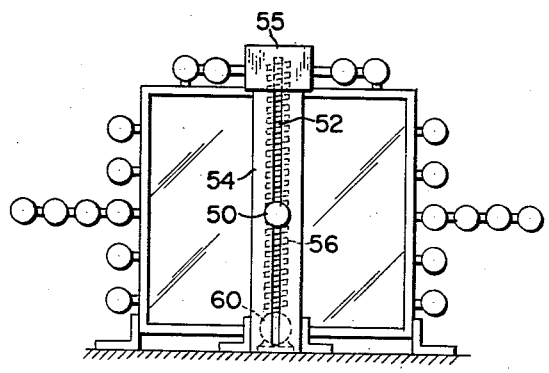

FIG. 3 is a side view of the datum light assembly of FIGS. 1 and 2, also showing a manually-operable control mechanism; and FIGS. 4 and 5 are side and front views, respectively, of a modification of the aircraft landing aid of FIGS. 1, 2 and 3.

Referring now to the embodiment of the invention set forth in FIGS. 1, 2 and 3 of the drawings, there is shown an aircraft carrier of the type having an angled deck 10 which allows an aircraft (such as designated by the reference numeral 12) to land at the same time that others are being catapulted from other portions of the deck. In the usual fashion, a number of wires forming part of a standard arresting gear are shown by the reference numeral 14 as stretching across the landing area. The broken line 16 is representative of the pilot's line-of-sight to the center strip 18 of the landing area, while a further broken line 20 represents the pilot's line-of-sight to an indicating device 22 fixedly mounted on the aircraft carrier to one side of the landing deck 10.

The indicating device 22 of FIG. 1 comprises a plurality of selectively-energizable datum lights combined in a particular manner with a plurality of constantly-energized reference lamps, and the relationship of these elements will be more clearly understood from the description of the operation of the arrangement now to be set forth in connection with FIGS. 2a, 2b and 2c of the drawings. It might be mentioned at this point, however, that the aircraft landing system to be described herein may, if desired, be employed in conjunction with other apparatus which is now more or less standard equipment on many naval vessels. As an aid in understanding the manner in which applicant's concept is coordinated with this previous equipment, reference is made to FIG. 2a, which shows a mirror 24 mounted in a generally vertical position and arranged to face the pilot of the approaching aircraft 12. This mirror 24 is supported upon a platform 26 so as to be rotatable through a limited angle about a horizontal axis. The platform 26 upon which the mirror 24 is mounted may be stabilized with reference to the horizon by a suitable gyro unit (not shown) to compensate for pitching and rolling movement of the ship. The above details of the mirror 24 and its associated equipment form no part of the present invention, and are set forth in Patent No. 2,784,925, issued March 12, 1957, to H. C. N. Goodhart. It is only necessary for the purpose of the present invention to recognize that this mirror 24 has associated therewith a series of horizontally-arranged indicator lights 28 located on each side of the mirror 24 and approximately midway between its upper and lower extremities. These reference lamps 28 serve to establish a horizontal reference level as seen by the pilot of aircraft 12, so that the particular indications provided by the optical device of applicant's concept may be positionally coordinated therewith in a manner now to be set forth.

In the above-mentioned patent to Goodhart there is disclosed a system yielding an image commonly described in naval terminology as a "meat-ball." By reflection of light from a fixed source mounted aft of the mirror 24, the apparent location of this source (that is, the image thereof) will possess a vertical position dependent upon the height of the aircraft 12 with respect to a predetermined proper glide path. Under many conditions this "meat-ball" arrangement operates satisfactorily, but when the deck of the carrier is pitching to any appreciable degree, the mirror 24 becomes extremely unreliable, and the landing of aircraft 12 is usually accomplished by the Landing Signal Officer "talking" the pilot into a favorable position. To eliminate this deficiency in the present arrangement, means are provided in the present disclosure for placing the information given to the pilot under the direct control of the LSO. Basically, an *artificial* meat-ball is substituted for the mirror 24, and visual information is given to the pilot of the manner in which the *LSO* is evaluating his approach. If the deck is pitching, the LSO estimates from his background of knowledge and experience where he believes the pilot *should* see the artificial meat-ball (hereinafter simplified to AMB). The same is true in instances when electrical or mechanical malfunctioning of the mirror system 24 occurs.

The artificial meat-ball (AMB) of the invention comprises a vertical row of lamps shown in detail in FIGS. 2a, b and c and generally designated by the reference numeral 39. As shown, seven lamps are arranged in a vertical row, and provision is made whereby any selected one of the lamps may be illuminated while the remainder of the lamps remain deenergized. Although a more complete description of the selector mechanism will be set forth in connection with FIG. 3, it may be mentioned at this time that the LSO may, for example, illuminate the centermost lamp 32 (FIG. 2a) when the aircraft 12 is approaching along the correct glide path. However if the aircraft to too high, the LSO may illuminate the topmost lamp 34 (FIG. 2b) while, in corresponding fashion, a too-low approach of aircraft 12 is visually communicated to the pilot by illumination of the bottommost lamp 36 (FIG. 2c). To facilitate a ready comprehension by the aircraft pilot of which particular one of the lamps 32, 34 and 36 is illuminated, the horizontal row of lights 28 is constantly illuminated to provide a background by reference to which the particular vertical lamp energized may instantly be ascertained.

The number of vertical lights employed is purely arbitrary, and depends upon the increment of correction which it is desired to communicate. For example, in FIG. 2b, if the aircraft approach is only slightly above the glide path, the intermediate lamp 38 may be illuminated. Correspondingly an approach which is higher than in the case just described but which does not reach a point where illumination of lamp 34 is necessary may be communicated to the pilot by energization of a further intermediate lamp 40.

If the LSO wishes to communicate to the pilot that no landing should be attempted, but that he should "wave off" he will flash a series of "wave-off" lights 42 which by their position and nature of energization will clearly bring to the pilot's attention that by reason of an incorrect landing position (or otherwise) he should not touch down upon the landing deck. These wave-off lights 42, however, have been known prior to applicant's invention, and are only mentioned as being complementary thereto. The same remarks apply to a further series of lights 44 which may be selectively energized in any desired manner to indicate to the pilot of aircraft 12 that he should reduce the speed of his craft by cutting or slowing down his motor.

In FIG. 3 is shown a side view of the vertical lamp assembly of FIGS. 2a, b and c together with a selector switch 46 the handle 48 of which is intended to be manually actuated in the direction of the arrows by the LSO while viewing the approach of aircraft 12. As shown, movement of handle 48 will result in selective energization of any particular one of the vertically-oriented lamps such as 32, 34, 36 etc. It is apparent that the LSO may instantly change the indication if the approach pattern of aircraft 12 changes during the landing operation. Obviously only one of the lamps 30 may be energized at any particular time, so that it is impossible to present misleading information of this nature to the aircraft pilot.

In FIGS. 4 and 5 is shown a further embodiment of the invention which provides a *continuous* correction of error rather than being limited to a number of incremental choices corresponding to the number of lamps comprising the series 30 of FIGS. 2 and 3. This continuous correction is accomplished by a single lamp 50 which is mounted for movement in an up-and-down direction in a slot 52 formed in a vertical standard 54 having an overhang 55. Behind the standard 54 (as seen by the pilot of aircraft 12) is a threaded shaft 56 encircled by a collar 58 supporting and positioning the lamp 50. It will now be appreciated that, upon rotation of shaft 56, the collar 58 and hence lamp 50 will move vertically, the direction of movement being determined by the direction of shaft rotation. The latter movement is achieved by energization of a reversible motor 60 acting through a pair of bevelled gears 62.

A control box 64 is provided with a pair of "up" and "down" buttons for controlling the polarity of the voltage applied to motor 60 and hence the direction of rotation thereof. Control panel 64 also contains a light intensity control switch 66, which may be a potentiometer providing regulation of the magnitude of the energy supplied to lamp 50 over a flexible conductor 68. Except for the details mentioned, the arrangement of FIGS. 4 and 5 is generally similar in its basic aspects to the apparatus illustrated in FIGS. 1, 2, and 3.

Obviously many modifications and variations of the present invention are possible in the light of the above teachings. It is therefore to be understood that within the scope of the appended claims the invention may be practiced otherwise than as specifically described.

I claim:

1. A device for aiding the pilot of an aircraft to follow a correct approach path to touchdown on a landing area of restricted size, said device being controllable by an observer of said craft stationed in the vicinity of said landing area, said device comprising:
   (a) a horizontal row of constantly-energized light sources located to one side of said landing area and facing in the direction from which said aircraft approaches;
   (b) a further constantly-energized signal light source movable vertically from a location above said row to a location below said row, said row of light sources thus constituting a reference level for a signal displayed to the pilot of said aircraft in accordance with the instantaneous vertical position of said movable light source;
   (c) electrically-energized apparatus for moving said further light source vertically and in a selected direction; and
   (d) a switch, operable by said aircraft observer, for controlling the energization of said apparatus and hence the movement of said further light source to a selected vertical position to thereby convey to the pilot of said aircraft information concerning the position of his craft with respect to the correct approach path to said landing area.

2. A device according to claim 1, in which said electrically-energized apparatus for moving said further light source includes a motor and a threaded shaft mounted with its axis of rotation extending vertically:
   (a) a threaded collar encircling said shaft and supporting and positioning said further light source thereon;
   (b) means for precluding rotary movement of said collar upon a rotation of said shaft; and
   (c) means, including a gear train, connecting said shaft to said motor so that the former will rotate about its axis when the motor is energized upon operation of said switch by said aircraft observer.

3. A device according to claim 2, further comprising intensity-control means for varying the amount of energy supplied to said further light source and hence degree of illumination thereof.

References Cited in the file of this patent

UNITED STATES PATENTS 2,975,400    Ferguson et al. _____ Mar. 14, 1961

NEIL C. READ, *Primary Examiner.*